US007737964B2

(12) United States Patent
Liu

(10) Patent No.: US 7,737,964 B2
(45) Date of Patent: Jun. 15, 2010

(54) ON-SCREEN DISPLAY SYSTEM

(75) Inventor: Chien-hsing Liu, Shijr (TW)

(73) Assignee: Aten International Co., Ltd. (TW)

( * ) Notice: Subject to any disclaimer, the term of this patent is extended or adjusted under 35 U.S.C. 154(b) by 1106 days.

(21) Appl. No.: 11/398,516

(22) Filed: Apr. 5, 2006

(65) Prior Publication Data

US 2007/0236481 A1 Oct. 11, 2007

(51) Int. Cl.
*G06F 3/038* (2006.01)

(52) U.S. Cl. ........................ 345/213; 345/156; 345/204; 345/629; 348/705; 348/706; 710/5; 710/64; 715/716; 715/748; 725/98; 725/150

(58) Field of Classification Search ................. 345/156, 345/157, 161, 163, 168, 204, 213; 710/1, 710/5, 64, 65, 72, 73, 100, 305, 316; 715/716, 715/748, 810; 348/705, 706
See application file for complete search history.

(56) References Cited

U.S. PATENT DOCUMENTS

| | | | | |
|---|---|---|---|---|
| 5,721,842 | A | 2/1998 | Beasley et al. | |
| 6,112,264 | A | 8/2000 | Beasley et al. | |
| 6,557,170 | B1 * | 4/2003 | Wilder et al. | 725/130 |
| 6,671,756 | B1 * | 12/2003 | Thomas et al. | 710/73 |
| 7,167,372 | B2 * | 1/2007 | Mori et al. | 361/731 |
| 7,441,063 | B2 * | 10/2008 | Tseng et al. | 710/305 |

* cited by examiner

*Primary Examiner*—Henry N Tran
(74) *Attorney, Agent, or Firm*—Chen Yoshimura LLP

(57) ABSTRACT

An on-screen display system is located externally a KVM switch. The on-screen display system includes a first end, an on-screen display circuit, a switch circuit and a second end. The first end receives a video signal from a computer. The on-screen display circuit generates an on-screen display menu signal. The switch circuit receives the video signal from the computer and the on-screen display menu signal from the on-screen display circuit. The on-screen display system combines the video signal and the on-screen display menu signal, or overlaps the on-screen display menu signal on the video signal to be displayed on the display according to a control signal.

32 Claims, 7 Drawing Sheets

Pin Assignment of VESA VGA D-Sub Male Connector

Pin Assignment of VESA VGA D-Sub Female Connector

Pin Assignment of OSD-cable D-Sub Male Connector

Pin Assignment of OSD-Cable D-Sub Female Connector

Tri-state buffer

ON-SCREEN DISPLAY SYSTEM

FIELD OF THE INVENTION

The present invention generally relates to an on-screen display system, and more particularly, to a cable or an external module capable of providing an on-screen display menu to a keyboard-video-mouse (KVM) switch or a console sharing device connected thereto.

BACKGROUND OF THE IVNENTION

An on-screen display (OSD) menu is widely used for operation and controlling a plurality of computers through a keyboard-video-mouse (KVM) switch or accessing one computer from a plurality of consoles via a console sharing device. Users can select any one of the pluralities of computers from the OSD menu present on a display of a console or send commands to the computer to access the computer from one of the consoles. Users can know the operation status of the computers from the OSD menu. Therefore, an on-screen display (OSD) circuit has been widely utilized to be almost a standard component inside the keyboard-video-mouse (KVM) switch or the console sharing device for remote accessing to the computer. However, the design of the KVM switch or the console sharing device has greatly been improved on aspects of functions. The number of computers joined to the KVM switch or the console sharing device has been greatly increased, particularly mentioning about the matrix KVM switch connecting a plurality of computers and a plurality of console devices. The circuitry integration inside the KVM switch is getting necessarily complicated with the great improvement for various functions and the increased number of the joined computers of the KVM switch.

Up to the present, all the on-screen display (OSD) circuits are built in the KVM switch, in the I/O module or the console module coupled to the KVM switch without any exception. The OSD circuit, which generates the OSD menu signal for the KVM switch or the console sharing device is quite related with the video signal processing of the jointed computers. When the length of the cable interconnecting between the KVM switch and console device (or the jointed computer) is extended, the magnitude of the video signal from the jointed computers might decay with the extension of the length of the cable due to the high frequency of the video signal transmission rate. Therefore, it is necessary to re-design the on-screen display (OSD) circuit for matching the video signal processing in the KVM switch system (the KVM switch, the I/O module or the console module coupled to the KVM switch) which is integrated into the main circuitry of the KVM switch even the main circuitry of the KVM switch, the I/O module or the console module is re-designed only little.

Furthermore, when the combing of the analog OSD menu signal and the analog video signal from the jointed computer is processed inside the KVM switch, the analog video signals are easily interfered by the electromagnetic field (EMF) generated by other circuits, especially the EMF generated by the high-frequency digital signal circuits. Thereupon, an abnormal, bothersome display caused by aforementioned interference can be observed on the display.

Moreover, in case the KVM switch without on-screen display (OSD) circuit thus without an OSD function is attempted to be upgraded to own the OSD function, it has to take much more effort and much more consideration to re-design the hardware circuit of the KVM switch to accommodate an OSD circuit and also delete interference caused by the electromagnetic field (EMF) generated by other circuits when re-designing the on-screen display (OSD) circuit for matching the video signal processing in the KVM switch system can not be avoided.

The OSD menu signal processing is more related with the standard of Video Graphics Array (VGA), Digital Visual Interface (DVI) or other standard for the extended developments of video signal process but not the KVM switch circuitry. Nowadays, an on-screen display (OSD) circuit is mostly embedded in the KVM main circuitry design. Such on-screen display circuit, which is built in the KVM main circuitry design is disclosed in U.S. Pat. No. 5,721,842 or its continuation applications, such as U.S. Pat. No. 6,112,264. The OSD circuit is as aforementioned to be arranged in the KVM switch, in the I/O module or the console module coupled to the KVM switch without exception. With the development of KVM switch, the on-screen display (OSD) circuit embedded inside has to be tuned up with the KVM switch main circuitry to have the perfect video signals without interference on the display when the KVM switch design is altered, for example: for meeting the different distances for coupling to the computer and console device, for increasing the capability of the number for jointing computers or consoles, for adding more extra-functions of KVM switch, for upgrading the KVM signals switching, KVM signals transmission performance between the computers and console. Each time, tuning the on-screen display (OSD) circuit with the KVM switch main circuitry becomes a must for the alteration of the KVM switch main circuitry, not to mention about a great tuning, the re-designing the on-screen display (OSD) circuit for matching the video signal processing in the KVM switch system when the KVM switch without OSD function is attempted to be upgraded to own the OSD function.

Furthermore, the types and purposes of KVM switch design by far could be hundreds, even thousands; therefore, it cost lots effort for reworking of the OSD circuit tuning. An OSD system located externally the KVM switch system or the console sharing device can solve kinds of problems mentioned above. The external OSD system can combine the video signal of the computer and the on-screen display menu signal or overlap the on-screen display menu signal on the video signal from the computer outside the KVM switch system (outside the KVM switch, outside the I/O module or the console module coupled to the KVM switch). Even though the KVM switch is re-designed, the OSD system remains focusing on the video signal processing without tuning with the KVM switch circuitry for each time. When the cable length between the KVM switch and console device extends, re-designing the OSD system for cable length is much simpler and much easier than redesigning the whole KVM switch and tuning the OSD circuit with. Even the KVM switch without OSD circuit is attempted to be upgraded to own the OSD function, the great tuning, the re-designing for the on-screen display (OSD) circuit in the KVM switch system is effortlessly completed.

Correspondingly, there is a need to develop an on-screen display (OSD) circuit separately from a keyboard-video-mouse (KVM) switch or a console sharing device for simplifying the structure of the circuitry therein and provide an on-screen display cable combining a video signal of a computer and an on-screen display menu signal or overlapping the on-screen display menu signal on the video signal.

SUMMARY OF THE INVENTION

To solve the foregoing drawbacks in the prior art, it is an objective of the present invention to provide an on-screen display system combining a video signal of a computer and an on-screen display menu signal or overlapping the on-screen display menu signal on the video signal in a cable for transmitting the video signal.

Another objective of the present invention is to provide an on-screen display system combining a video signal of a computer with on-screen display menu signal separately from a keyboard-video-mouse (KVM) switch or the console sharing device for simplifying the structure of the KVM switch or the console sharing device and for omitting tuning an on-screen display circuit with an KVM switch circuitry when the KVM switch is re-designed.

Another objective of the present invention is to provide an on-screen display system so that the on-screen display function can be effortlessly added into the KVM switch originally without the OSD circuit.

To accomplish the above objectives, the present invention provides an on-screen display system located between a KVM switch and a display of a console. The present on-screen display system combines the video signal and the on-screen display menu signal, or overlaps the on-screen display menu signal on the video signal. The system can be an external module outside the KVM switch or can be embedded in a cable as an on-screen display (OSD) cable. The on-screen display system mainly includes a first end, an on-screen display circuit, a switch circuit and a second end. The first end receives a video signal from the computer. The on-screen display circuit generates an on-screen display menu signal. The on-screen display circuit is controlled via a two wires communication channel, e.g. an Inter Integrated circuit bus or a display data channel. The switch circuit receives the video signal from the computer and the on-screen display menu signal and combines the video signal and the on-screen display menu signal, or overlaps the on-screen display menu signal on the video signal to be displayed on the display according to a control signal thereby.

The control signal can be a fast blanking output signal generated by the on-screen display circuit originally, or a command from an electronic apparatus, e.g. a keyboard-video-mouse switch or a console sharing device.

The on-screen display system further includes a power circuit for playing the role of a power supply for the whole on-screen display system. The power circuit may be the transformation from the vertical synchronization signal or the horizontal synchronization signal, an external power supplying or a power supplying wire of the cable as a power source. The on-screen display system further includes a sync polarizer for converting the polarity of either the vertical synchronization signal or the horizontal synchronization signal into a Vsync-Plus or a Hsync-Plus for meeting the requirements of different kind of on-screen display circuits.

As mentioned above, the on-screen display system can be embedded in a cable interconnecting between the electronic apparatus, e.g. the keyboard-video-mouse switch (or the console sharing device) and computers or between the electronic apparatus, e.g. the keyboard-video-mouse switch (or the console sharing device) and the display of the console device. As speaking of the case for the on-screen display system, being embedded in a cable, a system on chip (SoC) for integrating all circuits is a practicable form to achieve such idea.

Conclusively, the on-screen display system according to the present invention contributes to combine the video signal and the on-screen display menu signal, or overlap the on-screen display menu signal on the video signal to be displayed on the display separately from the keyboard-video-mouse (KVM) switch or the console sharing device. It simplifies the circuitry structure of the keyboard-video-mouse (KVM) switch or the console sharing device inside. Furthermore, tuning the on-screen display (OSD) circuit with the circuitry of the KVM switch or the console sharing device can be omitted for each alteration of the circuitry.

Meanwhile, as on-screen display system is implemented to be embedded in a cable for transmitting the video signal, a commercial cable, concentrating on combining the video signal from the computer and the on-screen display menu signal or overlapping the on-screen display menu signal on the video signal from the computer can be realized. With such an OSD cable, the KVM switch or the console sharing device ridden of the on-screen display circuit can elaborate the switching function because the left video signal combining or overlapping processing is executed separately.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
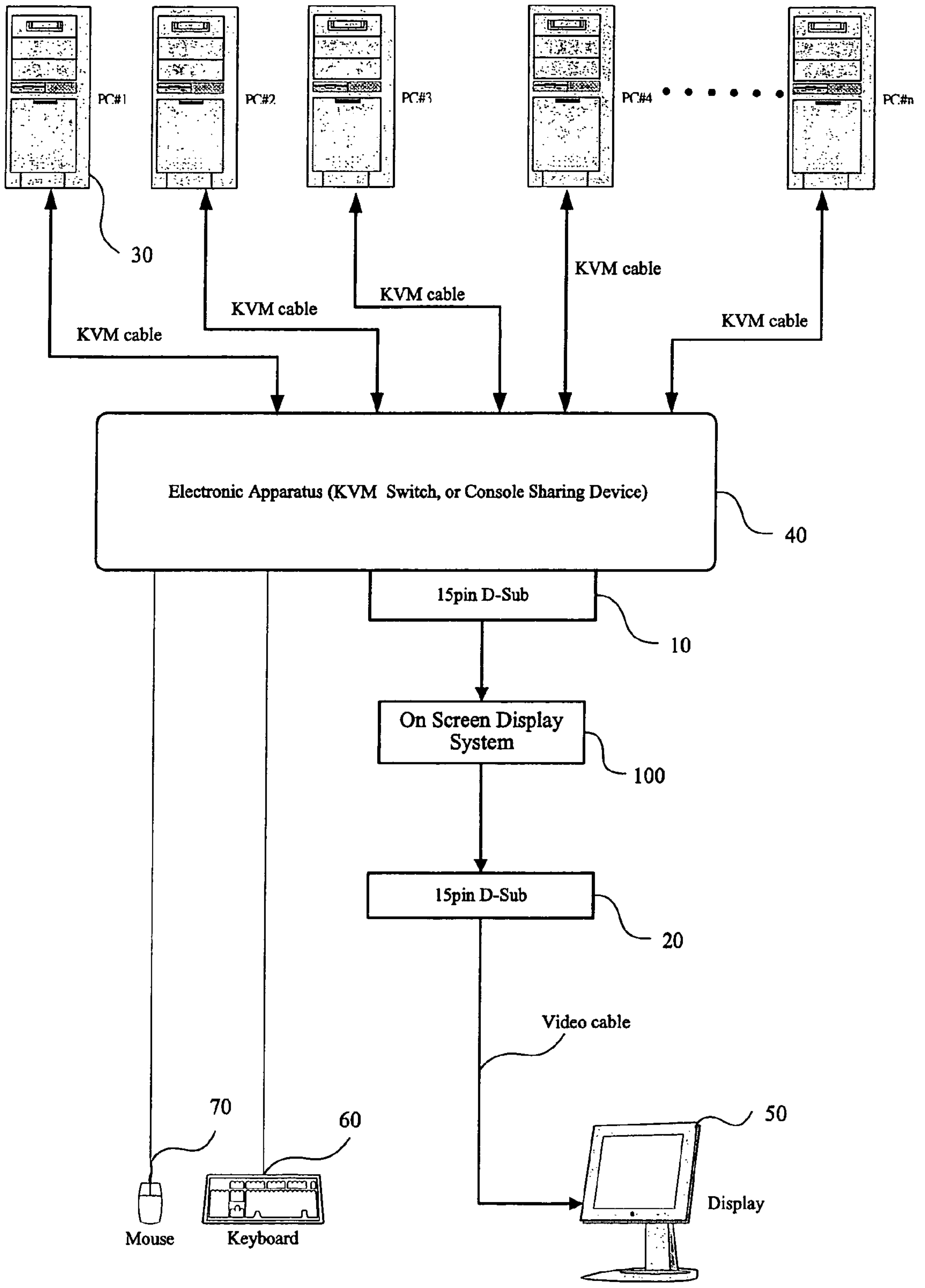
FIG. 1 illustrates a block diagram of a keyboard-video-mouse switch system, where an on-screen display system is embedded in a cable connecting a keyboard-video-mouse (KVM) switch to a display of a console according to one embodiment of the present invention.

Please refer to FIG. 1, wherein an on-screen display system 100 is embedded in a cable connecting a keyboard-video-mouse (KVM) switch 40 to a display 50 of a console according to one embodiment of the present invention. The keyboard-video-mouse (KVM) switch 40 is coupled to a console, including a display 50, a keyboard 60 and a mouse 70. A user, who controls at the console can invoke an on-screen display (OSD) menu generated by the on-screen display system 100 and remotely control the computer 30 (representing of a plurality of computers, PC#1~PC#n connected to the KVM switch 40. The on-screen display system 100 is embedded in the video transmission cable, which has a first end 10, such as a 15-pin D-Sub connector and a second end 20, such as a 15-pin D-Sub connector. The on-screen display system 100 connects the KVM switch 40 and the display 50 through the first end 10 and the second end 20, respectively. With such arrangement according to the present invention, the keyboard-video-mouse (KVM) switch 40 elaborates the switching function and leaves the process of combining or overlapping the video signals from the computer and the OSD menu signal from the on-screen display system 100. The on-screen display system 100 embedded in a cable according to the present invention is a commercial solution for a KVM user, the on-screen display system 100 can comply for the kinds of KVM switch, even the KVM switch without the OSD function when the display of the console is a common display complying the standard of VGA established by VESA, i.e. R, G, B terminals for video signal input but not restricted to VESA only. The on-screen display system 100 embedded in a cable according to the present invention is also considerable for the video signals of other standard.

Consequentially, the manufacturers of KVM switches can keep developing more functions on the KVM switch itself regardless of video signal processing issue related with the on-screen display circuit, for example, the display distortion effects caused by the video signal decay with the high frequency of transmission rate or caused by the interference generated from the other circuits inside the KVM switch. The present invention simplifies the circuitry structure of the KVM switch, especially related with the complicated video process. Furthermore, the present invention can effortlessly add the on-screen display function into the KVM switch without on-screen display (OSD) circuit. Similarly, the present invention contributes to a console sharing device.

Figure 2:
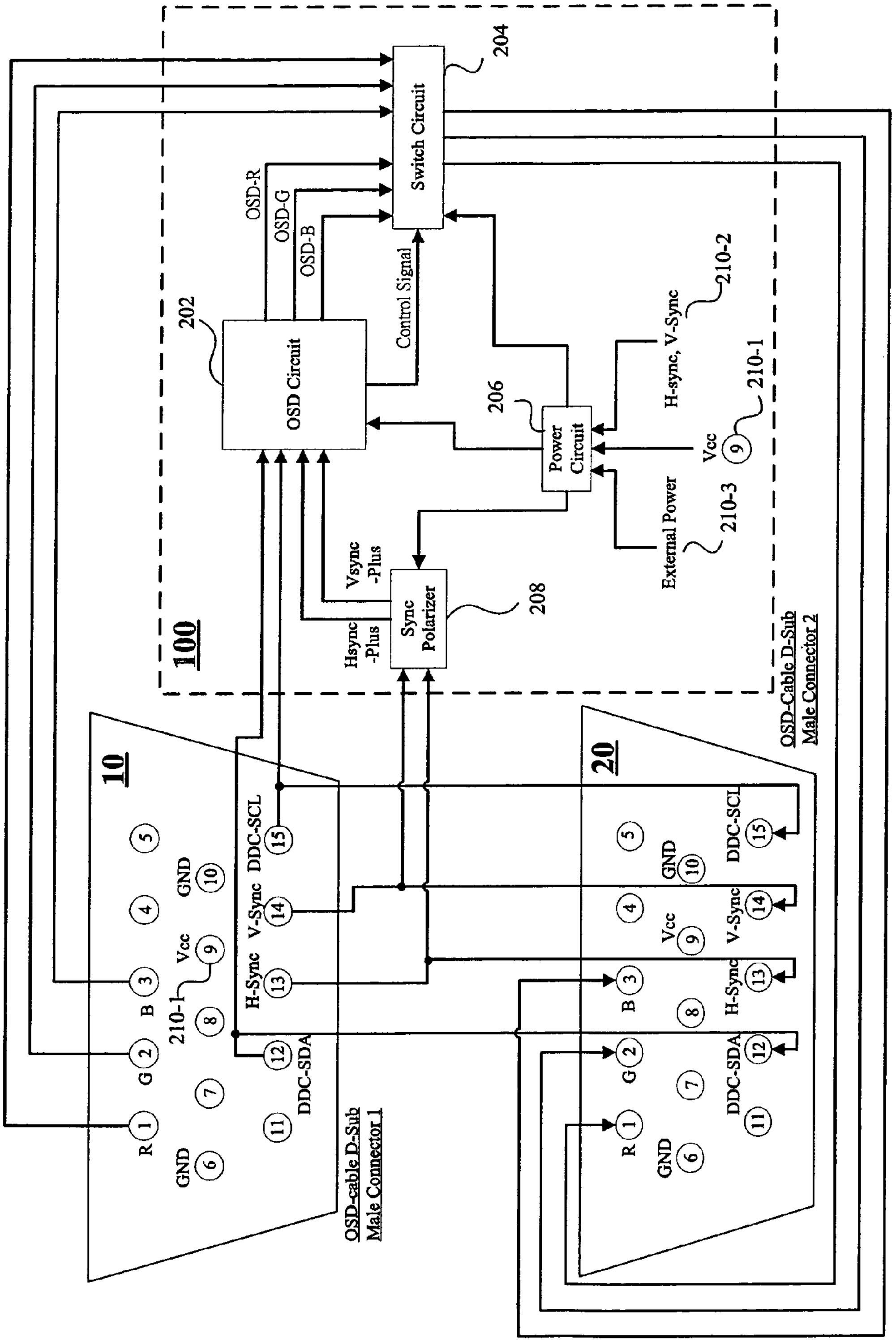
FIG. 2 illustrates a wiring block diagram of an on-screen display system embedded in a cable according to an embodiment of the present invention.

Please refer to FIG. 2, which illustrates a block diagram with wiring of the on-screen display system 100 shown in FIG. 1, embedded in a video transmission cable according to one embodiment of the present invention. The on-screen display system 100 mainly includes an on-screen display circuit 202 and a switch circuit 204. The on-screen display circuit 202 can be MTV021 offered by MYSON TECHNOLOGY. Furthermore, to satisfy requirement of MTV021, the on-screen display system 100 further includes an optional sync polarizer 208 for converting the polarity of the vertical synchronization (V-sync) signal or the horizontal synchronization (H-sync) signal into a polarized vertical synchronization signal Vsync-Plus or a polarized horizontal synchronization signal Hsync-Plus. Please note that the sync polarizer 208 can be omitted if MTV021 is replaced by the on-screen display circuit 202 which dose not need polarized vertical or synchronization signal.

In this embodiment, a Video Graphics Array (VGA) D-Sub Male Connector 1 (the first end) 10 receives the video signal from a computer 30 shown in FIG. 1 and another D-Sub Male Connector 2 (the second end) 20 is connected to a display 50 shown in FIG. 1. The on-screen display system 100 combines the video signal from the computer 30 shown in FIG. 1 and the on-screen display menu signal form the OSD circuit 202, or overlaps the on-screen display menu signal on the video signal to be displayed for.

The switch circuit 204 receives R, G, B components of the video signal from the computer 30 through proper pins (such as pins 1, 2, 3) of the first end 10 respectively. The sync polarizer 208 inverts the polarizations of H-sync and V-sync signals received through the pins 13, 14 of the first end 10 if necessary. The on-screen display circuit 202 receives the H-sync and V-sync signals or the polarized H-sync signal and the polarized V-sync signal (the Hsync-Plus and the Vsync-Plus) to generate and output R, G, B components (OSD-R, OSD-G, OSD-B) constituting an OSD menu signal to the switch circuit 204. Furthermore, a control signal (such as a Fast blanking output signal, FBKG signal) generated by the on-screen display circuit 202 or from the KVM switch 40 is used to control to the switch circuit 204. The switch circuit 204 combines the R, G, B components of video signal and the R, G, B components (OSD-R, OSD-G, OSD-B) constituting the OSD menu signal, or overlaps the R, G, B components (OSD-R, OSD-G, OSD-B) of the OSD menu signal on the R, G, B components of video signal to constitute a frame on the display according to the control signal (FBKG signal). In this embodiment, the FBKG signal of the OSD circuit is employed as the control signal. The on-screen display circuit 202 is further controlled by the KVM switch 40, through a display data channel bi-directional data (DDC-SDA) and a display data channel data clock (DDC-SCL), to generate the control signal. The DDC-SDA and the DDC-SCL will be described in more detail below. However, the control signal can be generated by the keyboard-video-mouse (KVM) switch or the console sharing device connected with. Nevertheless, a pre-defined pin assignment for the control signal will be necessary.

Furthermore, the on-screen display system 100 includes a power circuit 206 to provide a power for the on-screen display system 100. There will be at least three options for choosing the power source. Basically, the power circuit 206 can employ a power supplying wire from the pin 9, Vcc 210-1 of the first end 10 for providing the power. The pin 9 of the first end 10 gives a Display Data Channel (DDC) +5V voltage for VGA video transmission according to the VESA standard. Optionally, the power circuit 206 can transform the H-sync and V-sync signals 210-2 for providing the power. Otherwise, the power circuit 206 can use an external power supplying 210-3 for providing the power.

Specifically, the on-screen display system 100 is controlled by the keyboard-video-mouse switch or the console sharing device. The command used to control the on-screen display system 100 is transmitted from a keyboard 60 or a mouse 70 through the keyboard-video-mouse switch 40 (all shown in FIG. 1) via proper pins, such as pin 12 and pin 15, of the first end 10. The pin 12 is a display data channel bi-directional data (DDC-SDA) and the pin 15 is a display data channel data clock (DDC-SCL). Originally, the DDC-SDA pin 12 is in charge of transmitting data of the display maker, the series number of display and the dot per inch (dpi) information for the display, etc and the DDC-SCL pin 15 is in charge of transmitting a synchronization clock for the DDC-SDA. In this embodiment, besides the above functions, these two wirings of the first end 10 are further employed to transmit the command from the keyboard-video-mouse switch or the console sharing device to the on-screen display system 100 simultaneously. With the addressing (ADDR)-capable characteristic of $I_2C$ circuit (the DDC is a kind of $I_2C$ circuit), transmitting the command for the on-screen display system 100 or the DDC-SDA in one wiring can be achieved to complete the present invention.

Moreover, controlling the on-screen display system 100 via $I_2C$ is illustrated here although, controlling via other data transmission standard, e.g. RS-485, a standard for serial multi-point communications lines or CANbus, a serial bus designed for industrial environments also can be implemented in the present invention. Furthermore, the pin number of the first end 10 for transmitting the command for the on-screen display system 100 is also not restricted. The pin number in this embodiment is two but it depends on the requirement of the on-screen display circuit.

Figure 3:
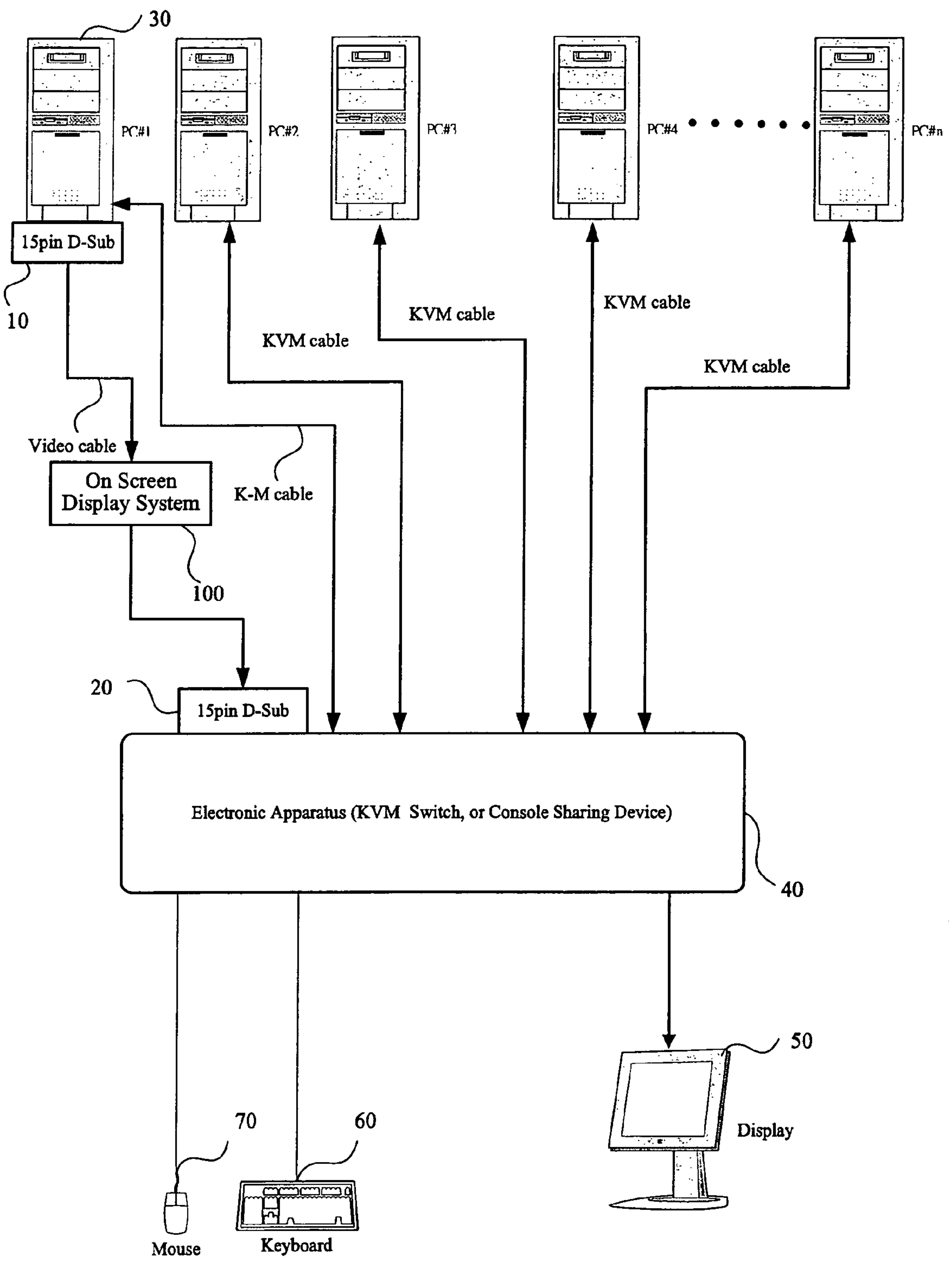
FIG. 3 illustrates another block diagram of a keyboard-video-mouse switch system, wherein an on-screen display system is embedded in a cable connecting a keyboard-video-mouse (KVM) switch to a computer according to another embodiment of the present invention.

Please refer to FIG. 3, wherein the on-screen display system is embedded in a cable connecting a computer 30 to a keyboard-video-mouse (KVM) switch 40 according to another embodiment of the present invention. As the same shown in FIG. 1, the on-screen display system 100 is embedded in the video transmission cable, which has a first end 10, such as a 15-pin D-Sub connector, and a second end 20, such as a 15-pin D-Sub connector. The difference from previous embodiment of the present invention is that the on-screen display system 100 connects the computer 30 and the KVM switch 40 through the first end 10 and the second end 20, respectively.

Figure 4A:
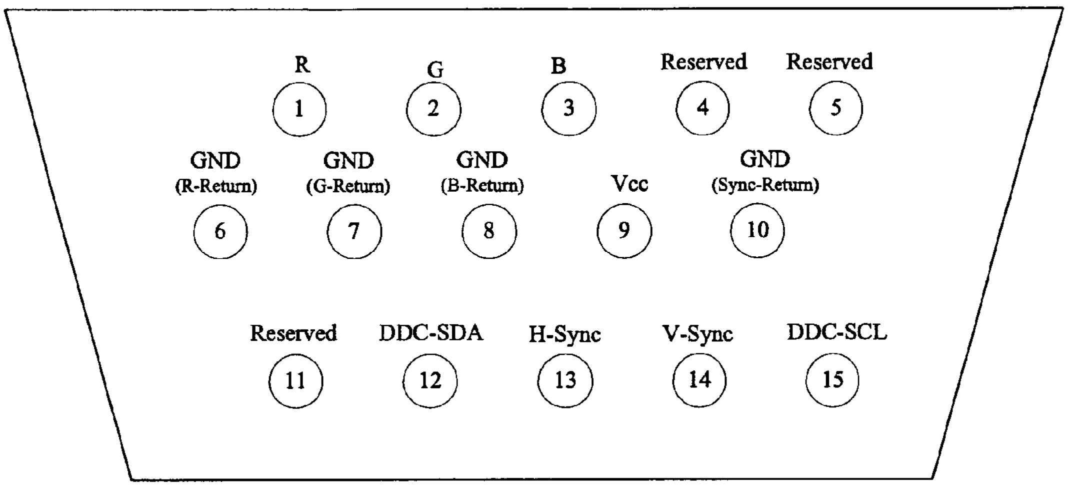
FIGS. 4A & 4B show diagrams of Pin Assignments according to Video Graphics Array (VGA) D-Sub Connectors complying with the VESA standard according to an embodiment of the present invention.
Figure 4B:
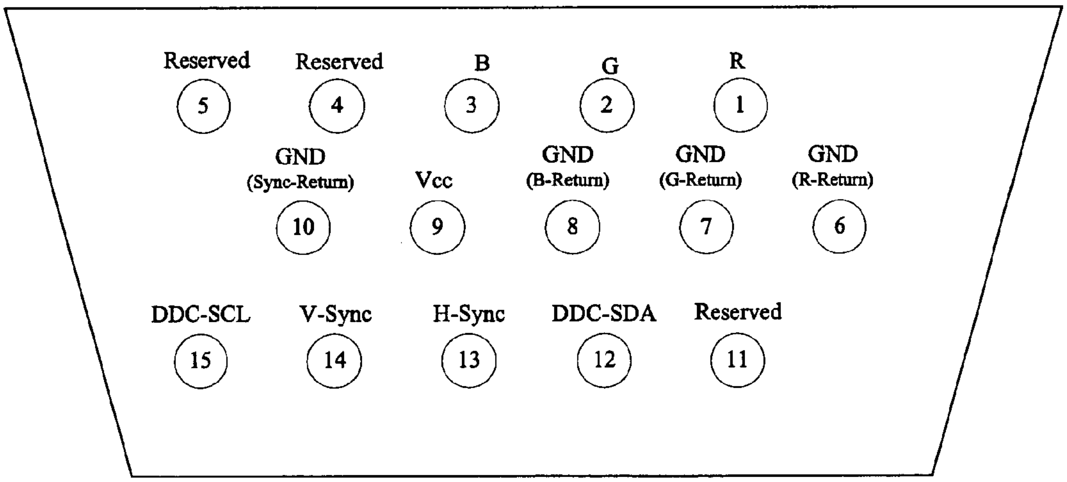
Figure 5A:
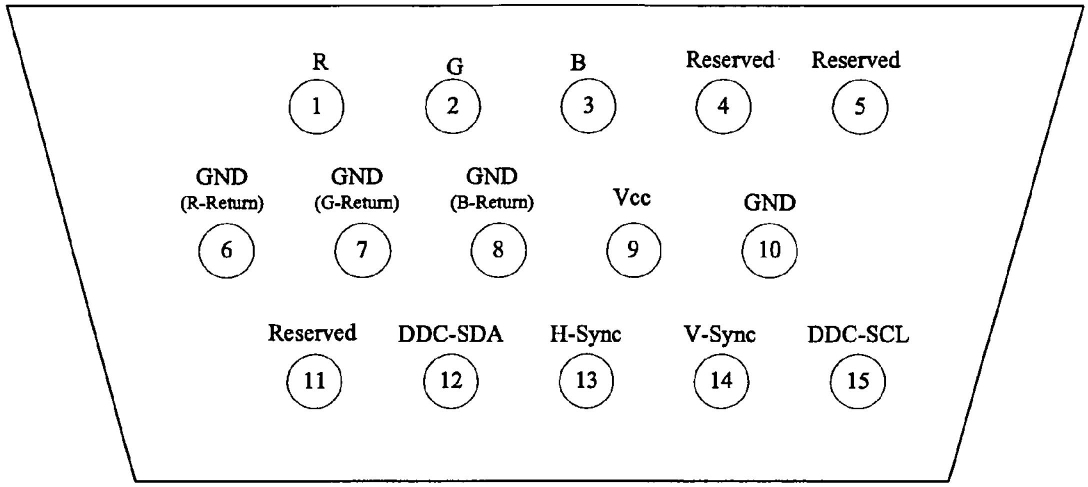
FIGS. 5A & 5B show diagrams of Pin Assignments according to D-Sub Connectors of a cable embedded with on-screen display system shown in FIG. 2.
Figure 5B:
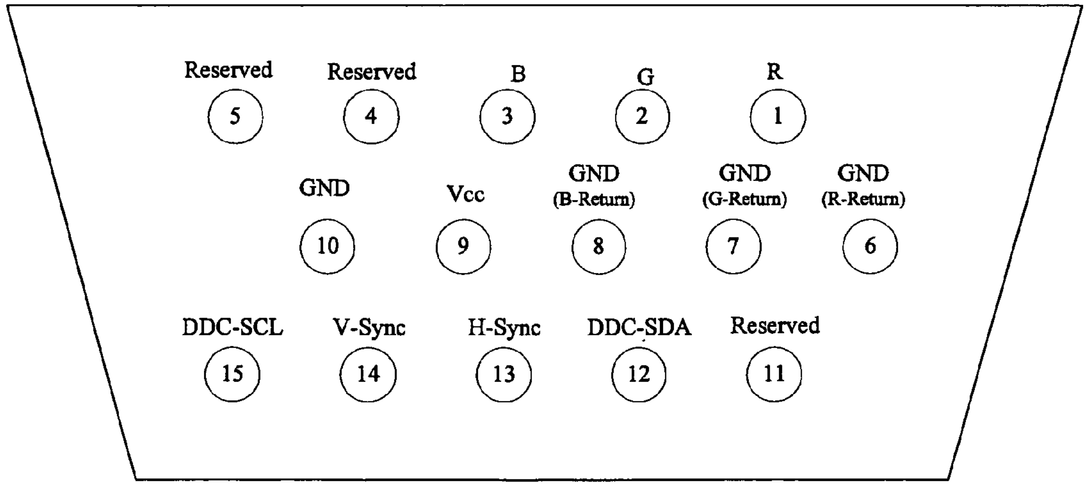

Please refer to FIGS. 4A & 4B with FIGS. 5A & 5B. FIGS. 4A & 4B shows diagrams of Pin Assignments of Video Graphics Array (VGA) D-Sub Connectors complying with the VESA standard. FIGS. 5A & 5B shows diagrams of Pin Assignments according to D-Sub Connectors of a video transmission cable embedded with the present on-screen display system 100 shown in FIG. 1 to FIG. 3. These related pins for combining the video signal and the on-screen display menu signal, or overlapping the on-screen display menu signal on the video signal according to the present invention totally complies the VESA standard of the VGA interface. The pin (1, 2, 3) is for transmitting the R, G, B components of the video signal from the computer. The pin 9 is for providing the Display Data Channel (DDC) +5V voltage in VGA interface. The pin 12 and pin 15 are for transmitting the display data channel bidirectional data (DDC-SDA) and the display data channel data clock (DDC-SCL). The pins (13, 14) are for transmitting the H-sync and V-sync signals. Originally, the H-sync and V-sync signals are directly transmitted to the display. The on-screen display circuit 202 according to the present invention employs the H-sync and V-sync signals to generate and output R, G, B components (OSD-R, OSD-G, OSD-B) constituting the OSD menu signal to the switch circuit 204 shown in FIG. 3. It is readily apparent to those skilled in the art that the present invention is not intended to be limited to the exemplary pin assignment shown in FIGS. 5A & 5B.

In a word, the user who has the present on-screen display system 100 does not have to re-design the related hardware in the KVM switch or the console sharing device even the pin assignment of the video transmission cable according to the present invention with the addressing (ADDR)-capable characteristic of the DDC channel is not according to the VESA standard. When the on-screen display function is added into the KVM switch originally without OSD function, by simply upgrading or revising the related firmware in the KVM switch, the compatibility between the coupled on-screen display system cable and the KVM switch can be achieved. According to the present invention, there is no need to re-design the hardware of the whole KVM switch without OSD function significantly when the OSD function is desired. Mainly, the revised firmware in the KVM switch only involves the output pins of video signal connectors in charge of DDC-SDA and DDC-SCL. Although, the D-Sub 15 pin interface of the DDC channel according to the VESA standard is illustrated here. It is readily apparent to those skilled in the art that the present invention is also suitable for the interfaces in other non-VESA standards for transmitting video signal.

Figure 6:
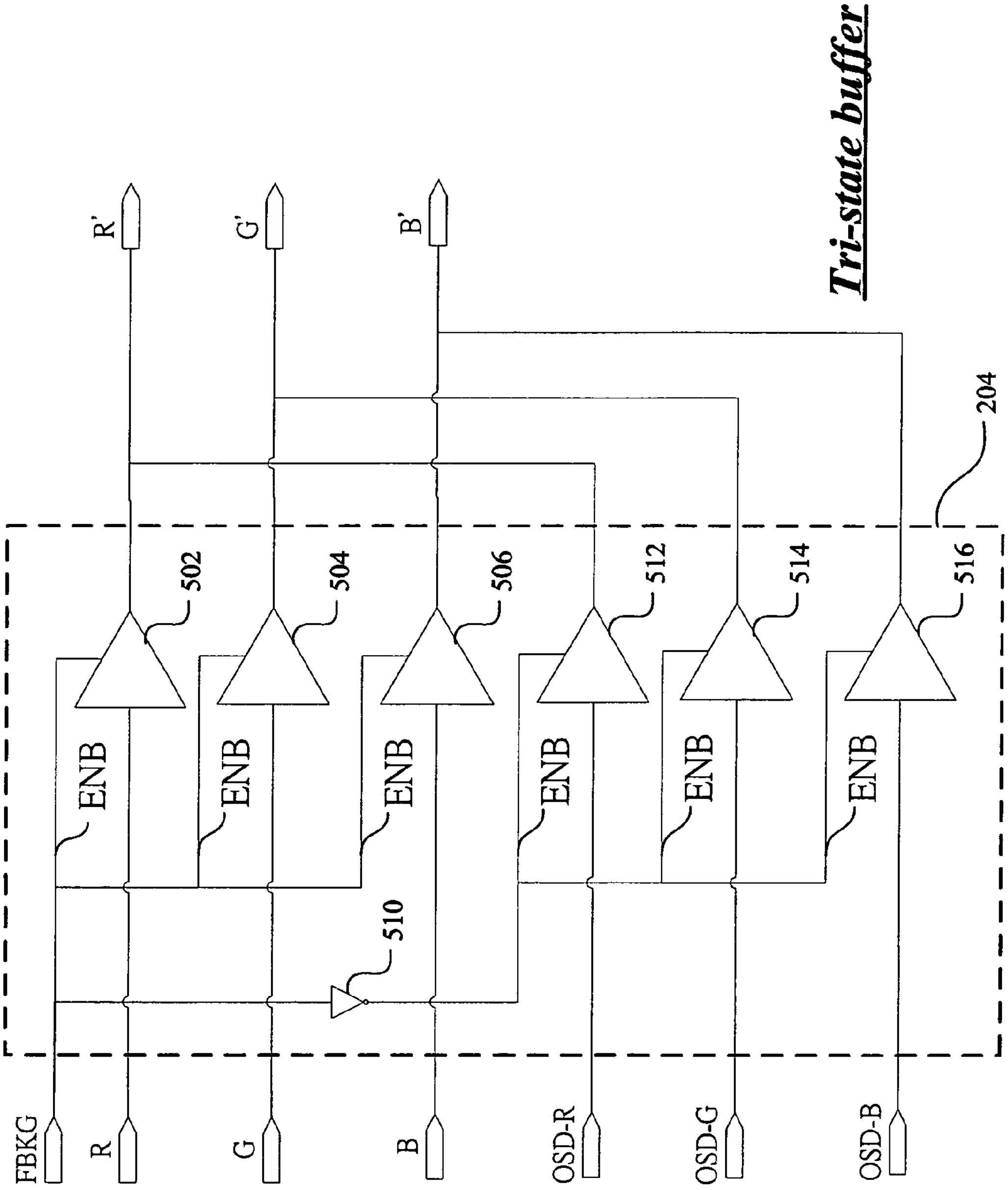
FIG. 6 illustrates a circuitry of the switch circuit, which employs tri-state buffers for switching to output R', G', B' components of the video signal obtained from a computer or an on-screen display circuit by a control signal (FBKG signal from OSD circuit) according to first embodiment of the switch circuit in present invention.

Please refer to FIG. 6 illustrating an exemplary circuitry of the switch circuit 204 that employs tri-state buffers for switching to output R', G', B' components of the video signal. The switch circuit 204 combines the video signal from the computer and the on-screen display menu signal, or overlapping the on-screen display menu signal on the video signal from the computer according to first embodiment in the present invention.

There are three tri-state buffers (502, 504, 506) for each R, G, B components of the video signal from the computer 30 shown in FIG. 1 or FIG. 3 and another three tri-state buffers (512, 514, 516) for the OSD-R, OSD-G, OSD-B components constituting the OSD menu signal from the on-screen display circuit 202. Meanwhile, a control signal (such as a Fast blanking output from the KVM switch, or a FBKG signal from the on-screen display circuit 202) is sent to the tri-state buffers (502, 504, 506), and sent to the tri-state buffers (512, 514, 516) through an inverter 510 to change the polarization of the control signal. The control signal is used as a determining signal for the switch circuit 204 to combine the R, G, B components of the video signal and the OSD-R, OSD-G, OSD-B components constituting the OSD menu signal, or overlap the OSD-R, OSD-G, OSD-B components constituting the OSD menu signal on the R, G, B components of the video signal as the R', G', B' components of the video signal to constitute respective portions of each frame on the display.

Figure 7:
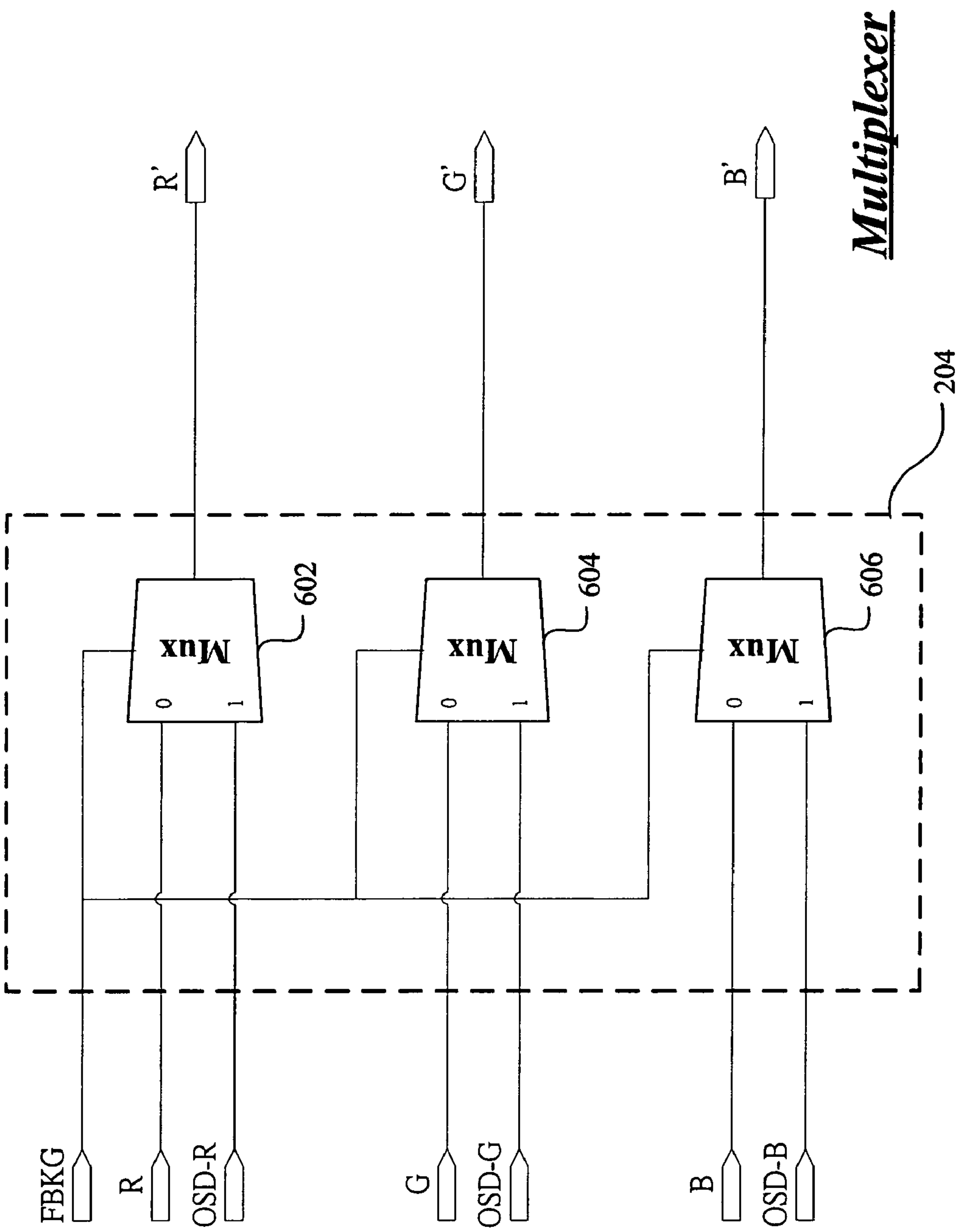
FIG. 7 illustrates another circuitry of the switch circuit, which employs multiplexers for switching to output R', G', B' components of the video signal by control signal (FBKG signal from OSD circuit) according to second embodiment of the switch circuit in present invention.

Please refer to FIG. 7, which illustrates another exemplary circuitry of the switch circuit 204 shown in FIG. 2, which employs multiplexers for outputting the R', G', B' components of the video signal according to second embodiment in present invention. There are three multiplexers (602, 604 and 606). The first multiplexer 602 receives R component and OSD-R component. The second multiplexer 604 receives G component and OSD-G component. The third multiplexer 606 receives B component and OSD-B component. As same as the firsts embodiment shown in FIG. 6, a control signal (such as the Fast blanking output from the KVM switch, or the FBKG signal from the on-screen display circuit 202) is sent to the three multiplexers (602, 604, 606) as a determining signal for the switch circuit 204 to combine the R, G, B components of the video signal and the OSD-R, OSD-G, OSD-B components of the OSD menu signal, or overlap the OSD-R, OSD-G, OSD-B components of the OSD menu signal on the R, G, B components of the video signal as the R', G', B' components of the video signal to constitute respective portions of each frame on the display. Furthermore, the tri-state buffer shown in FIG. 6 and the multiplexer shown in FIG. 7 are illustrated, although. Similar electric circuit such as a select circuit, a transmission gate or a logic combination gate can be employed to compose the switch circuit as well as the tri-state buffers and the multiplexers.

The on-screen display system 100 according to the present invention contributes to combine the video signal and the on-screen display menu signal, or overlap the on-screen display menu signal on the video signal to be displayed on the display separately from the electronic apparatus, e.g. KVM switch or the console sharing device for simplifying the structure of the KVM switch or the console sharing device and for omitting tuning an on-screen display circuit with an KVM switch circuitry when the KVM switch is re-designed. Meanwhile, such on-screen display system is implemented to be embedded in a cable, located between the electronic apparatus and the computer or between the electronic apparatus and the display of the console device, for transmitting the video signal from a computer to the display, a commercial cable, concentrating on combining a video signal of a computer and an on-screen display menu signal or overlapping the on-screen display menu signal on the video signal from the computer can be realized. The KVM switch or the console sharing device ridden of the on-screen display circuit can elaborate the switching function because the left video signal combining or overlapping processing is executed separately.

Meanwhile, the present invention provides an on-screen display system so that the on-screen display function can be effortlessly added into the KVM switch originally without the OSD circuit.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A cable for coupling an electronic apparatus, connected to a computer, to a display of a console device, the cable comprising:

a first end, receiving a video signal, a vertical synchronization signal and a horizontal synchronization signal from the computer through the electronic apparatus;

an on-screen display circuit, generating an on-screen display menu signal;

a switch circuit, receiving the video signal from the computer and the on-screen display menu signal to combine the video signal and the on-screen display menu signal, or overlap the on-screen display menu signal on the video signal;

a sync polarizer for converting the polarity of either the vertical synchronization signal or the horizontal synchronization signal; and a second end, coupled to the display to output the video signal received from the switch circuit to be displayed on the display.

2. The cable of claim 1, wherein the electronic apparatus is one selected from the group consisting of a keyboard-video-mouse switch and a console sharing device.

3. The cable of claim 1, wherein the on-screen display circuit is controlled by the electronic apparatus via two wires.

4. The cable of claim 1, wherein the on-screen display circuit is controlled by the electronic apparatus via an Inter Integrated circuit bus.

5. The cable of claim 1, wherein the on-screen display circuit is controlled by the electronic apparatus via a display data channel.

6. The cable of claim 5, wherein the first end further comprises a first connector having a first pin configuration, wherein the first connector further comprises a DDC-SDA pin and a DDC-SCL pin.

7. The cable of claim 5, wherein the second end further comprises a second connector having a second pin configuration corresponding to the first pin configuration, wherein the second connector further comprises a DDC-SDA pin and a DDC-SCL pin.

8. The cable of claim 1, wherein the switch circuit combines the video signal and the on-screen display menu signal, or overlaps the on-screen display menu signal on the video signal to constitute a frame on the display according to a control signal.

9. The cable of claim 8, wherein the control signal is generated by one apparatus selected from the group consisting of the on-screen display circuit, the keyboard-video-mouse switch and the console sharing device.

10. The cable of claim 1, further comprising a power circuit, providing a power source for the cable.

11. The cable of claim 10, wherein the power circuit is one selected from the group consisting of an external power supply, a power supplying wiring of the cable and a transformation from the vertical sync signal or the horizontal sync signal.

12. The cable of claim 1, wherein the switch circuit is selected from the group consisting of a multiplexer, a tri-state buffer, a select circuit, a transmission gate and a logic combination gate.

13. The cable of claim 1, wherein the on-screen display circuit and the switch circuit are embedded in the cable between the first end and the second end.

14. A cable, for coupling a computer to an electronic apparatus connected to a display of a console, the cable comprising:

a first end, receiving a video signal, a vertical synchronization signal and a horizontal synchronization signal from the computer;

an on-screen display circuit, generating an on-screen display menu signal;

a switch circuit, receiving the video signal from the computer and the on-screen display menu signal to combine the video signal and the on-screen display menu signal, or overlap the on-screen display menu signal on the video signal;

a sync polarizer for converting the polarity of either the vertical synchronization signal or the horizontal synchronization signal; and a second end, coupled to electronic apparatus to output the video signal received from the switch circuit to be displayed on the display.

15. The cable of claim 14, wherein the switch circuit is one selected from the group consisting of a multiplexer, a tri-state buffer, a select circuit, a transmission gate and a logic combination gate.

16. The cable of claim 14, wherein the electronic apparatus is one selected from the group consisting of a keyboard-video-mouse switch and a console sharing device.

17. The cable of claim 14, wherein the on-screen display circuit is controlled by the electronic apparatus via two wires.

18. The cable of claim 14, wherein the on-screen display circuit is controlled by the electronic apparatus via an Inter Integrated circuit bus.

19. The cable of claim 14, wherein the on-screen display circuit is controlled by the electronic apparatus via a display data channel.

20. The cable of claim 19, wherein the first end further comprises a first connector having a first pin configuration, wherein the first connector further comprises a DDC-SDA pin and a DDC-SCL pin.

21. The cable of claim 19, wherein the second end further comprises a second connector having a second pin configuration corresponding to the first pin configuration, wherein the second connector further comprises a DDC-SDA pin and a DDC-SCL pin.

22. The cable of claim 14, wherein the switch circuit combines the video signal and the on-screen display menu signal, or overlaps the on-screen display menu signal on the video signal to constitute a frame on the display according to a control signal.

23. The cable of claim 22, wherein the apparatus generating the control signal is generated by one apparatus selected from the group consisting of the on-screen display circuit, the keyboard-video-mouse switch and the console sharing device.

24. The cable of claim 14, further comprising a power circuit, providing a power source for the cable.

25. The cable of claim 24, wherein the power circuit is one selected from the group consisting of an external power supply, a power supplying wiring of the cable and a transformation from the vertical sync signal or the horizontal sync signal.

26. The cable of claim 14, wherein the on-screen display circuit and the switch circuit are embedded in the cable between the first end and the second end.

27. A system, located between a computer and a console including a display, a keyboard and a mouse, the system comprising:

an electronic apparatus, connected to the computer and connected directly to the keyboard and the mouse; and an on-screen display system which comprises:

a first end, receiving a video signal, a vertical synchronization signal and a horizontal synchronization signal from the computer through the electronic apparatus;

an on-screen display circuit, generating an on-screen display menu signal;

a switch circuit, receiving the video signal from the computer and the on-screen display menu signal to combine the video signal and the on-screen display menu signal, or overlap the on-screen display menu signal on the video signal;

a sync polarizer for converting the polarity of either the vertical synchronization signal or the horizontal synchronization signal; and a second end, coupled to the display to output the video signal received from the switch circuit to be displayed on the display.

28. The system of claim 27, wherein the electronic apparatus is one selected from the group consisting of a keyboard-video-mouse switch and a console sharing device.

29. The system of claim 27, wherein the on-screen display system is an external module embedded in a cable.

30. An on-screen display system, located between a computer and an electronic apparatus, connected to a display of a console device, the on-screen display system comprising:

a first end, receiving a video signal, a vertical synchronization signal and a horizontal synchronization signal from the computer;

an on-screen display circuit, generating an on-screen display menu signal;

a switch circuit, receiving the video signal from the computer and the on-screen display menu signal to combine the video signal and the on-screen display menu signal, or overlap the on-screen display menu signal on the video signal;

a sync polarizer for converting the polarity of either the vertical synchronization signal or the horizontal synchronization signal; and a second end, coupled to electronic apparatus to output the video signal received from the switch circuit to be displayed on the display.

31. The system of claim 30, wherein the electronic apparatus is one selected from the group consisting of a keyboard-video-mouse switch and a console sharing device.

32. The system of claim 30, wherein the on-screen display system is an external module embedded in a cable.

* * * * *